Figure 1:
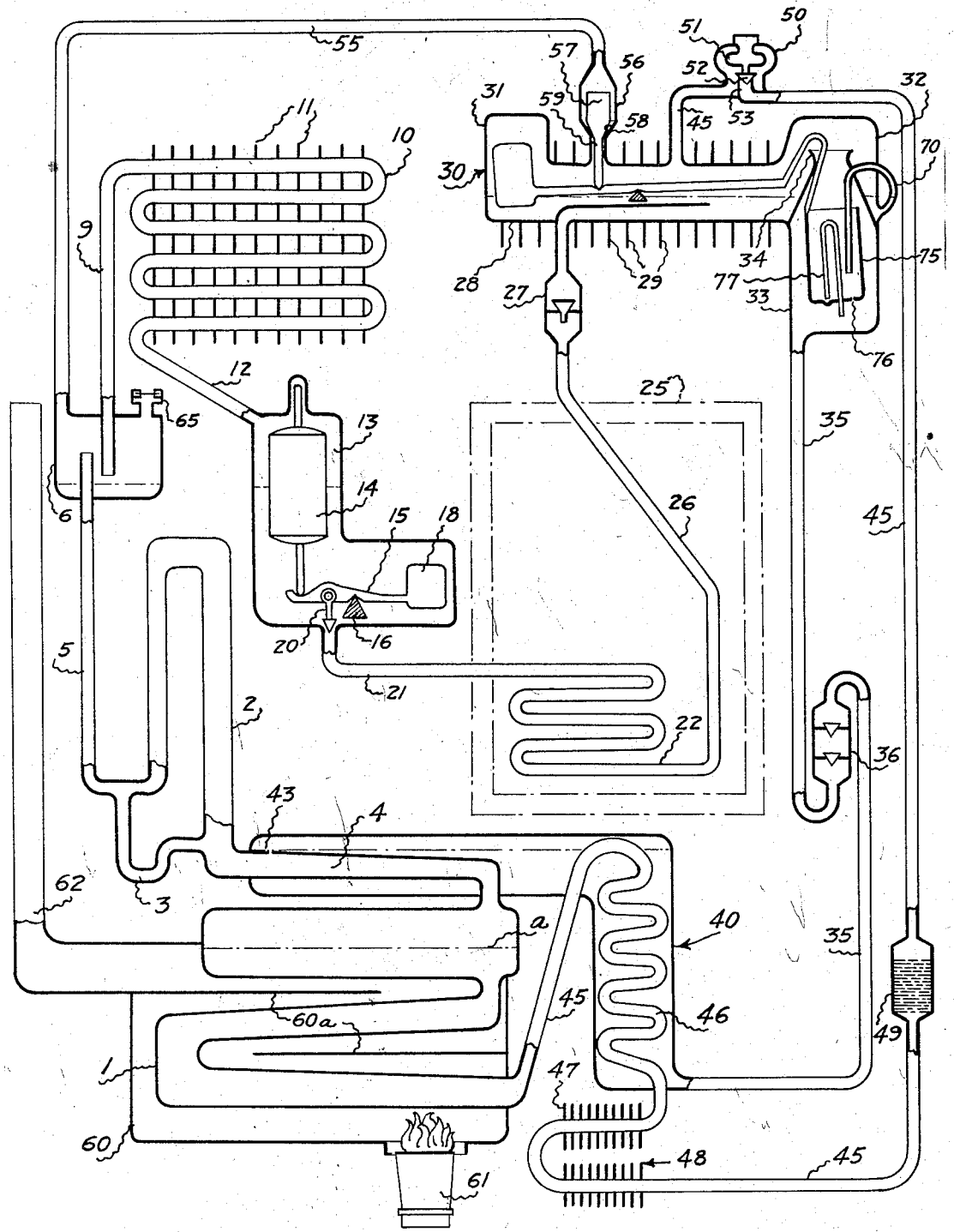

Feb. 8, 1944. W. G. MIDNIGHT 2,341,188
ABSORPTION REFRIGERATION APPARATUS
Filed Nov. 7, 1941 5 Sheets—Sheet 1

INVENTOR.
WILBUR G. MIDNIGHT
BY
ATTORNEYS

Feb. 8, 1944.   W. G. MIDNIGHT   2,341,188
ABSORPTION REFRIGERATION APPARATUS
Filed Nov. 7, 1941   5 Sheets-Sheet 2

INVENTOR.
WILBUR G. MIDNIGHT
BY
ATTORNEYS

Feb. 8, 1944.  W. G. MIDNIGHT  2,341,188
ABSORPTION REFRIGERATION APPARATUS
Filed Nov. 7, 1941  5 Sheets-Sheet 5

INVENTOR.
WILBUR G. MIDNIGHT
BY
Hull West
ATTORNEYS.

Patented Feb. 8, 1944

2,341,188

UNITED STATES PATENT OFFICE 2,341,188

ABSORPTION REFRIGERATION APPARATUS

Wilbur G. Midnight, Shaker Heights, Ohio, assignor to Perfection Stove Company, Cleveland, Ohio, a corporation of Ohio Application November 7, 1941, Serial No. 418,217

18 Claims. (Cl. 62—5)

My invention consists in improvements in continuously heated absorption refrigeration apparatus of the class comprising a closed system of conduits and vessels containing a fluid refrigerant and a liquid absorber therefor, and characterized by a high pressure section and a low pressure section. A constantly heated generator and a condenser form parts of the high pressure section of the system, and an evaporator or refrigerating unit, a part of the low pressure section. The absorber is situated between the two sections and is adapted to be periodically subjected to the high pressure of the first mentioned section, so as to effect a practical equalization of pressure between the absorber and the generator, permitting return of the strong liquor from the former to the latter. At all other times, while performing its absorbing function, the absorber is subjected to the low pressure in the second mentioned section.

A major problem in this class of refrigeration apparatus is how to satisfactorily and automatically bring about, in a practical and economical way, the return of the strong liquor from the absorber, which, during absorption, is of necessity at low pressure, back to the generator, which is always at high pressure.

The primary purpose of the invention is to solve this problem by providing, in apparatus of the class referred to, relatively simple, positively acting, and thoroughly practical and reliable means for effecting the return of the strong liquor from the absorber to the generator, and which renders unnecessary the use of thermostatic controls, snap action or slide valves, and other more complicated and frequently troublesome mechanisms required in prior apparatus of the class to which my invention pertains.

Also, in many such prior apparatus the evaporating function, which is responsible for refrigeration, ceases during liquid return, as will hereinafter more fully appear. Another object, therefore, is to so reduce in matter of time the period of liquid return, and so relate the absorption phase thereto, that no perceptible or practical interruption in refrigeration occurs.

A further object of the invention is to provide constantly heated absorption refrigeration apparatus that is susceptible to a wide range of sizes; that is capable of being made relatively small and light of weight; wherein air cooling is practicable due to relatively small heat input; that operates satisfactorily under extreme outside or atmospheric temperature conditions; and that is durable and dependable.

Figure 2:
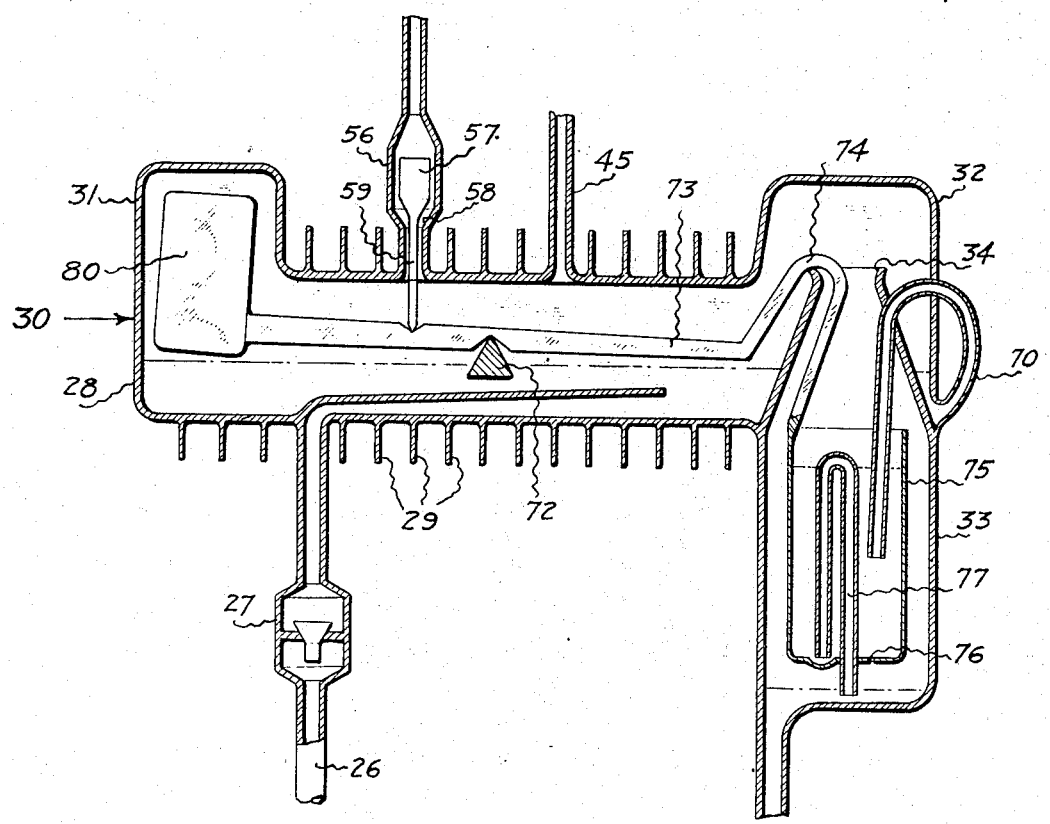
Figure 3:
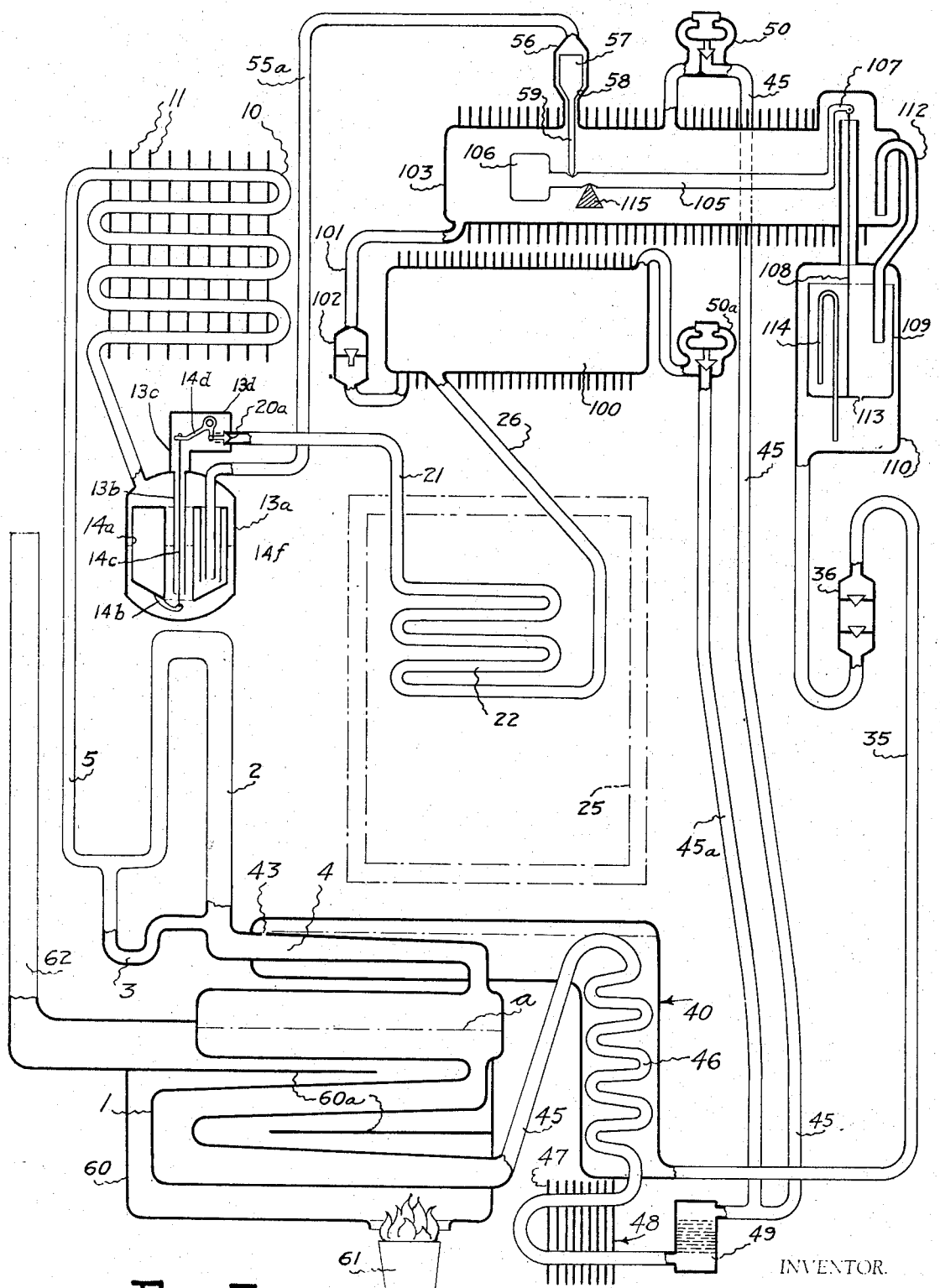
Figure 4:
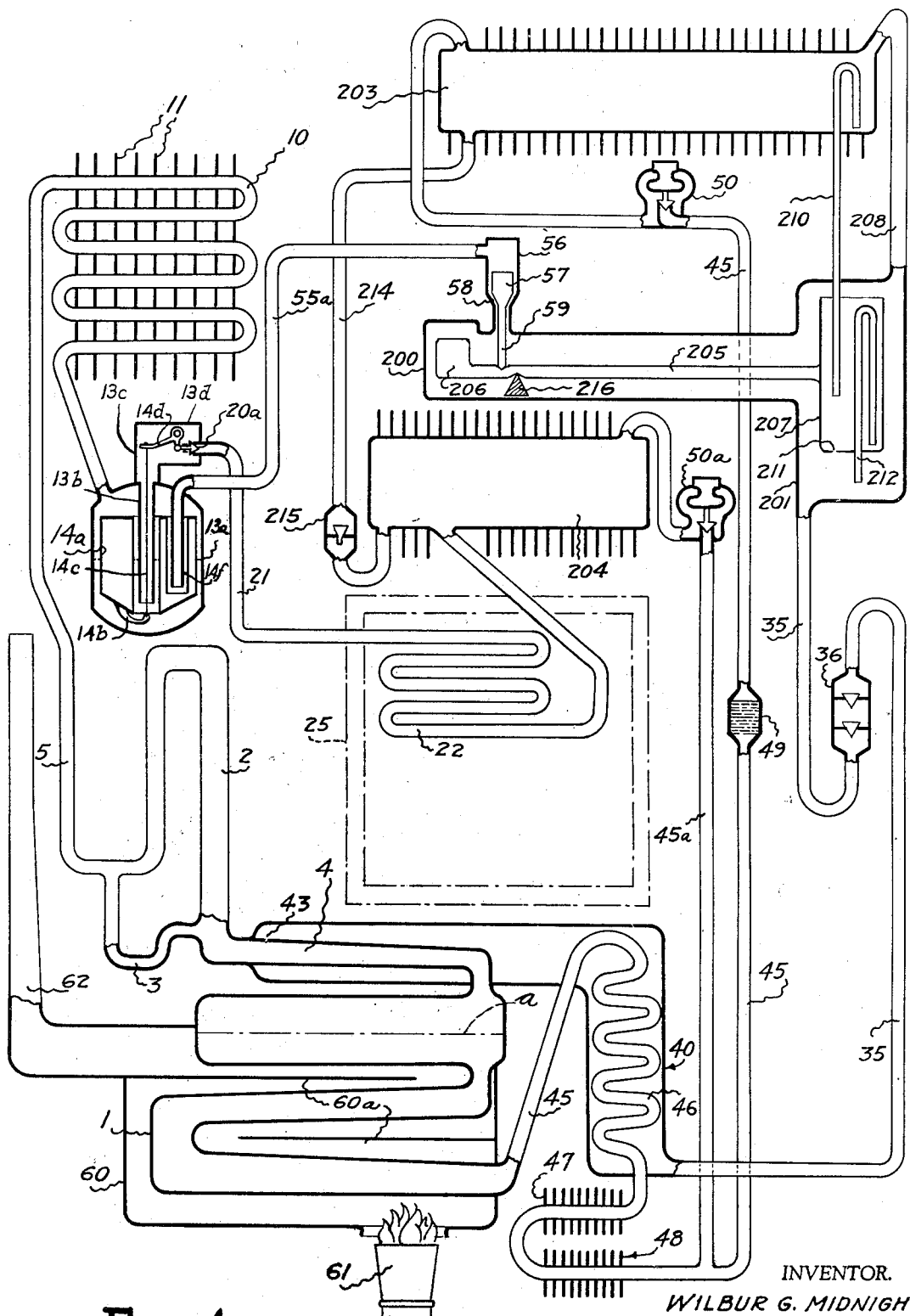
Figure 5:
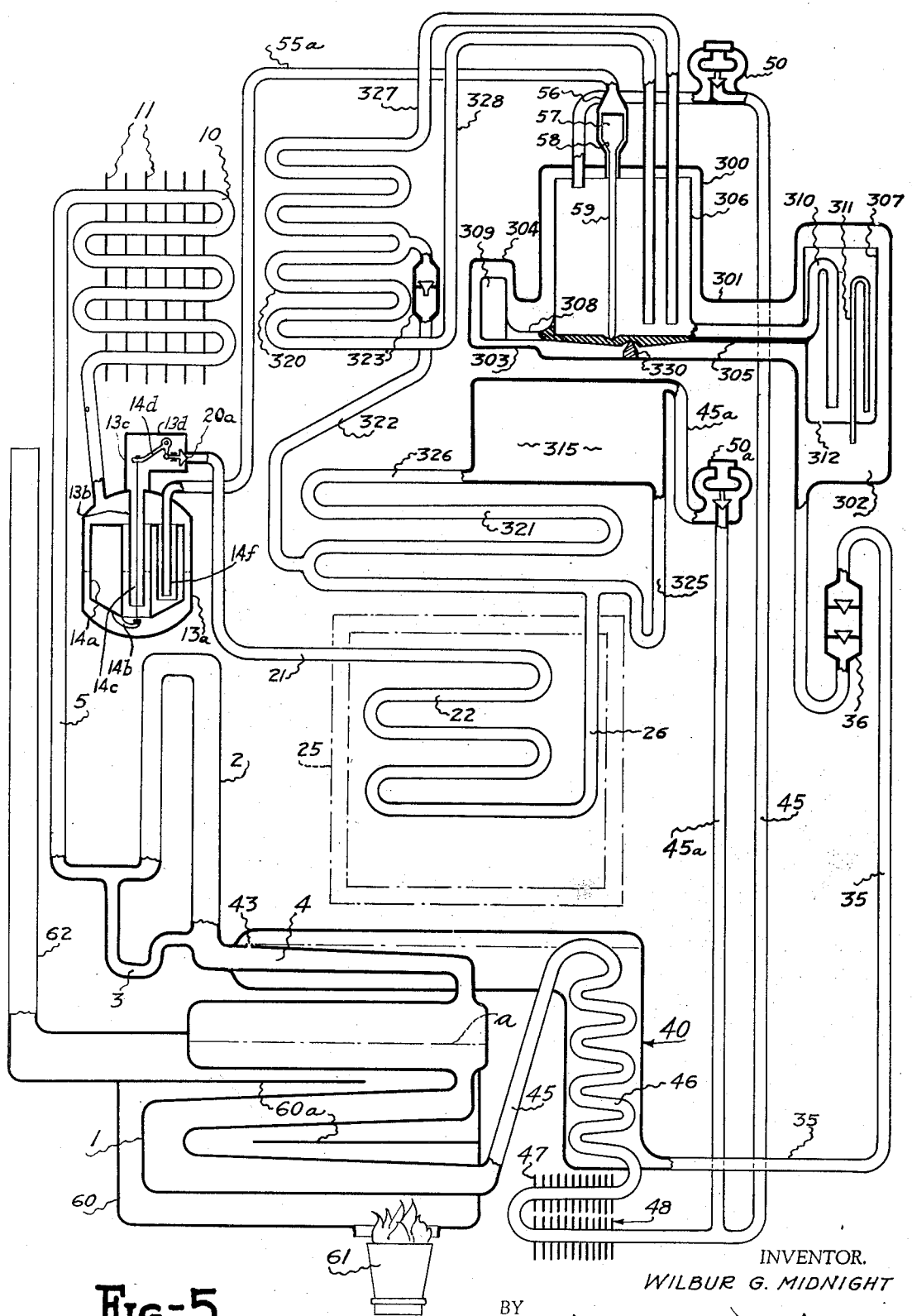

The foregoing objects and advantages, with others hereinafter appearing, are attained in the embodiments of the invention illustrated in a more or less schematic fashion in the accompanying drawings wherein Fig. 1 is a diagram representing a form of the invention wherein the absorber consists of a unitary vessel or enclosure containing the mechanism for periodically effecting equalization of pressure between the high pressure and low pressure sections of the system, and, as a consequence thereof, the return of the strong liquor from the absorber to the generator; Fig. 2 is an enlarged sectional view of the absorber and the mechanism enclosed thereby and showing the latter in the other of its extreme positions than the one disclosed in the former view and as it would appear during liquid return; and Figs. 3, 4 and 5 are views, similar to Fig. 1, showing, respectively, three different modifications of the invention that are distinguished from the first form principally by the inclusion of auxiliary absorbers.

The apparatus, according to Fig. 1, comprises a generator 1, and a dehydrator 2 containing a drain 3 in the form of a gooseneck for effecting a liquid seal at this point. The generator communicates, through a conduit 4, with the dehydrator 2, and the latter, through a conduit 5, with a trap 6. The outlet end of the conduit 5 is disposed some distance above the bottom of the vessel that constitutes the trap. A conduit 9 leads from near the bottom and out through the top of the trap to a condenser 10. The condenser is shown as a coil provided with heat abstracting fins 11, and it drains, through a conduit 12, into a receiver 13. The receiver is shown as an L-shaped vessel, and in the vertical branch thereof is located a float 14, desirably in the form of a hollow metal body, that is sustained by one end of a lever 15 disposed within the horizontal portion of the vessel. The lever is fulcrumed on a bearing 16 suitably supported within the vessel. The float, whose walls are relatively heavy to withstand the high pressure to which they are subjected, is counterbalanced by a weight 18 that is carried by the end of the lever 15 opposite that which sustains the float, and between the float and the bearing 16, a valve 20 is operatively connected to the lever and controls the discharge of liquid from the receiver through a conduit 21 to an evaporator 22, shown as a coil that is located within the refrigeration compartment of a cabinet represented at 25. It will be understood that a suitable valve seat, wherewith the valve 20 cooperates, surrounds the inlet end of the conduit 21.

A conduit 26, containing a non-return flow device 27, shown as an upwardly opening check valve, leads from the evaporator to the bottom of a vessel 28 that constitutes the absorber, the unit being designated generally by the reference numeral 30. The vessel 28 is shown as equipped with heat abstracting fins 29. According to the design illustrated, domes 31 and 32 rise from the opposite ends of the vessel 28, and depending from the vessel below the dome 32 is a sump 33 from the bottom of which leads a drain conduit 35, containing a non-return flow device 36, desirably self acting and shown as a double check valve, said drain conduit communicating at its end remote from the absorber with a heat exchanger 40. This unit, as illustrated, consists of an inverted L-shaped vessel, within the horizontal branch of which is housed the previously mentioned conduit 4 through which the generator communicates with the dehydrator. The conduit 4 has an aperture 43 that is shown as located just inside the terminus of the horizontal branch of the heat exchanger.

Leading from the bottom portion of the generator to the top portion of the absorber is a conduit 45 through which, as will presently more fully appear, weak liquor is conveyed from the generator to the absorber. The generator end of the conduit 45 is shown as inclined upwardly to where it enters the vertical branch of the heat exchanger 40 and, descending therein in the form of a coil 46 passes out through the bottom wall of said exchanger. Beyond the heat exchanger a portion of the conduit is formed into a loop and is provided with heat abstracting fins 47, thereby to constitute of such portion a liquid cooler 48. The conduit 45 is shown as including a filter 49 and, adjacent its point of connection with the absorber, a pressure actuated valve 50 for which might be substituted an orifice, common in such apparatus. Where a pressure actuated valve is employed, it may be of usual character, including a diaphragm or bellows 51 that is subjected to the pressure in the absorber and carries the valve body 52, arranged for cooperation with a seat 53. The valve body is biased in a direction to engage the seat, thereby to shut off flow of liquid through the conduit 45, and is removed from the seat through the action of the diaphragm or bellows 51. A spring, with or without adjusting means for varying its tension, may be used to urge, or assist in urging, the valve body 52 toward its seat. Such an expedient is so common, illustration is deemed unnecessary. Furthermore, the resiliency of a metal diaphragm or bellows might be depended upon to generally serve the purpose.

Leading from a suitable part of the high pressure section of the system—the top of the trap 6 in the present case—to the top portion of the absorber 30, is a conduit 55 containing what may be termed an equalizing valve that is designated generally by the reference numeral 56, and which may be of any suitable form. The same, as illustrated herein, comprises a valve member 57 that is biased, by its weight or otherwise, toward closed position against a seat 58 and said member is provided with a long stem 59 that projects through the plane of the seat and into the vessel 28.

During the whole time the apparatus is in use, heat is uninterruptedly applied to the generator 1. According to the embodiments shown, a casing 60, provided with interior baffles 60ª, confines heat to and distributes it about the generator, the heat being supplied by a combustion device or burner 61 that is situated below an opening in the bottom of the casing. The products of combustion escape from the casing through a flue 62.

As a safety measure to relieve abnormally high internal pressure without explosion, such as might result from exposure of the apparatus to the heat of a burning building, a blow-off device may be incorporated in the apparatus, desirably in communication with the high pressure section of the system; and in Fig. 1 such a device, designated 65, is shown as mounted on the trap 6. Obviously, this feature is applicable to all forms of the invention.

The mechanism for effecting the periodic return of strong liquor from the absorber to the generator will now be described. This mechanism, according to the embodiment illustrated in Figs. 1 and 2, is housed within the absorber 30. The sump 33 of the absorber is separated from the liquor compartment thereof by an upwardly convergent or frusto conical wall 34 that rises above the maximum liquid level in the absorber. Leading by its short leg from the bottom part of the liquor compartment of the absorber is a siphon 70 that is shown as having a part disposed outside the absorber and as entering the absorber slightly below the top of the wall 34 and as extending inwardly through said wall and having its long leg depending into the sump 33. The high part or overflow of the siphon 70 determines the maximum liquid level in the absorber, as will presently appear.

Mounted within the body portion of the absorber for oscillation upon a bearing 72 is a rocker arm 73 having a hook-like extension 74 at one end that extends up and over the wall 34 and thence downwardly and carries, within the sump 33, a receptacle or bucket 75 through the open top of which descends the long leg or discharge end of the siphon 70. The bucket 75 is provided at its lower end with a relatively small drain hole 76, and disposed within and carried by the bucket is a siphon 77. The long leg or discharge end of the siphon 77 opens through the bottom of the bucket into the sump 33. A weight 80 is carried by the end of the rocker arm 73 opposite that which sustains the bucket 33, and is accommodated in its movements by the dome 31, while the dome 32 affords room for the vertical movement of the hooked end 74 of the rocker arm. The stem 59 of the valve member 57, that constitutes a part of the previously mentioned equalizing valve 56, bears upon or otherwise has operative connection with the rocker arm 73 between the weight 80 and the pivotal axis of the arm, defined by the bearing 72.

It might be well to explain before proceeding further the reason for employing both the drain hole 76 and the siphon 77 as means for emptying the bucket 75. If the drain opening alone were used, the emptying of the bucket would be too slow. On the other hand, if only the siphon 77 were employed, and an appreciable quantity of liquor should be splashed into the bucket during shipment or handling of a portable unit incorporating the invention, insufficient, however, to overflow through the siphon and thus start the siphonic action, the rocker arm 73 would be maintained in a position to hold the equalizing valve open and the apparatus could not be made to function, as will be more fully appreciated as the description proceeds.

The closed system comprising the vessels and conduits above described contains a quantity of fluid refrigerant, desirably ammonia, and a suitable absorbent therefor, desirably water, in proper proportions, and forming what is commonly referred to as liquor. A somewhat variable but substantial quantity of the liquor is at all times present in the generator 1, the mean level being about that indicated in the drawings by the dot-and-dash lines a, and with heat constantly applied to the generator, as by the combustion device or burner 61, the liquor within the generator is caused to boil and give off vapors that are preponderantly refrigerant and which pass out through the conduit 4 into the dehydrator 2 where all or nearly all of the absorbent vapors, carried along with the refrigerant vapors, condense and drain back directly or through the drain 3 into the generator. From the dehydrator the vapors pass on through the conduit 5 to the trap 6, where any remaining absorbent is removed, and thence through conduit 9 to the coil 10 of the condenser. Here the vapors are condensed and gravitate through the conduit 12 to the receiver 13. When enough liquid refrigerant accumulates within the receiver 13 to lift the float 14, the valve 20 is opened and the liquid refrigerant flows through conduit 21 to the evaporator 22 that is located within the refrigeration compartment of the cabinet 25. Here the refrigerant is vaporized by the heat extracted from the atmosphere within said compartment and passes on as a gas through the conduit 26, past the non-return flow device or check valve 27, to the absorber 30, where it is absorbed by the weak liquor delivered to said vessel from the generator, in a manner soon to be described.

Under the action above set forth, a relatively high pressure prevails throughout the part of the system containing the generator and condenser and including the conduit 55 that leads to the equalizing valve 56 adjacent the absorber 30. Hence the application of the term "high pressure section" to the aforesaid part of the system.

Due to the specific gravity of its respective constituents, the liquor stratifies or separates more or less within the generator, with the strongest adjacent the top and the weakest at the bottom. Under the influence of the high pressure existing in the section of the system containing the generator, weak liquor is forced from the bottom of the generator through the conduit 45 to the absorber 30, under the automatic control of the pressure actuated valve 50, the diaphragm or bellows 51 of which is exposed to the pressure in the absorber. In its passage from the generator through the heat exchanger 40 and liquid cooler 48, the temperature of the weak liquor is lowered considerably below that of the generator and more nearly to that of the absorber, and it is cleared of any foreign matter in its course from the generator to the absorber by the filter 49, desirably located in advance of the pressure actuated valve 50.

By the mixture of the weak liquor thus delivered to the absorber 30 with the refrigerant gas conducted to the absorber through the conduit 26, a rich liquor is produced that accumulates within the liquor compartment of the absorber until it overflows the high part of the siphon 70, whereupon a flow of said liquor through the siphon is initiated. As soon as enough liquor has been delivered to the bucket 75 to overcome the counteracting influence of the weight 80, the rocker arm 73 swings in a direction to lift, through the stem 59, the valve member 57 of the so-called equalizing valve 56 from the seat 58 thus establishing communication between the high pressure section of the system and the absorber 30. This causes for the time being a substantially equalized pressure between the absorber and the generator, and as a consequence thereof the liquor is permitted to flow by gravity from the absorber toward the generator. Rich liquor from the liquor compartment of the absorber continues to flow through the siphon 70 until said compartment is practically empty. At the same time, the bucket 75 is emptying through the relatively small drain opening 76 and through the siphon 77, the action being obvious. From the sump 33 the rich liquor flows through the conduit 35 past the check valve 36 to the heat exchanger 40 and, overflowing through the aperture 43 in the conduit 4, passes back into the generator 1. When the bucket 75 empties, the weight 80 swings the rocker arm 73 in a direction to close the equalizing valve 56 and lift the bucket to its former position. Upon closing of the equalizing valve, communication between the high and low pressure sections of the system ceases.

Thus it will be seen that my invention provides a relatively simple and reliable means, devoid of intricate mechanisms that are liable to get out of order, for transferring, at intervals, the rich liquor from the absorber to the generator of an absorption refrigeration apparatus of the kind in question; and that, due to the fact that the absorber practically empties at each liquid transfer, the action of the transfer means is such that interruption of refrigeration, in the form of the invention above described, is negligible.

In function, the modified forms of the apparatus illustrated, respectively, in Figs. 3, 4 and 5, are distinguished from the previously described form by providing uninterrupted refrigeration, this being effected through the use of an auxiliary absorber, as will presently more fully appear.

The structural differences are principally in and about the absorber, although there are slight changes in the design of the receiver to which the liquid refrigerant is delivered from the condenser, and, in the modifications, the pressure equalizing connection between the high and the low pressure sections are shown as leading from said receiver, rather than from the trap as in the first described form. Therefore, the parts of the modifications that are the same, or substantially the same, as in the first described form, will be designated by the same reference characters as those first applied to such parts; otherwise, they will be differently marked.

In each of the modifications illustrated, respectively, in Figs. 3, 4 and 5, the receiver 13$^a$ is in the form of a vessel within which is a central, vertical pipe 13$^b$ that is connected at its upper end, by a leak-proof joint, to the top wall of the vessel about a hole therein. Rising from said top wall about said hole is a neck 13$^c$ that is surmounted by a casing 13$^d$. The conduit 21 leads from the casing 13$^d$ to the evaporator 22, and flow of the liquid refrigerant therethrough is controlled by a valve 20$^a$ that is located within the casing 13$^d$. An annular float 14$^a$ is enclosed by the receiver and surrounds the pipe 13$^b$ and is operatively connected to the previously mentioned valve 20$^a$ through a bracket 14$^b$ on the lower end of the float, a rod 14c that rises from said bracket through the pipe 13b, and a bell crank 14d that is pivotally supported within the casing 13d and has one of its braches connected to said rod 14c and its other branch to the valve 20a. A well 14f is incorporated in the float and opens through the top thereof into the gas space of the receiver, and projecting downwardly through the top wall of the receiver and into said well, so as ordinarily to be shielded from the liquid contents of the receiver, is an end portion of a pressure equalizing conduit 55a that is the equivalent of the conduit 55 of the previously described form of the invention and, similarly thereto, communicates through the equalizing valve 56 with the absorber. It may be well to point out at ths time that, while the equalizing conduit 55a normally communicates with the gas portion only of the receiver (exceptions to this condition hereinafter to be explained), the conduit 21 constantly communicates with the liquid containing portion of the receiver through the casing 13d and the pipe 13b, the latter terminating near the bottom of the receiver vessel well below the liquid level therein, the approximate liquid level in said vessel being indicated by the dotted line appearing in each of Figs. 3, 4 and 5.

It may be explained, also, that the well 14f of the float 14a opens at its lower end into the interior of the float so that the gas pressure within the float is balanced with that surrounding it, thereby to avoid having to make the walls of the float heavy enough to withstand the high pressure that prevails within the vessel 13a, as would be necessary if the hollow float were sealed. If condensate accumulates within the float above the lower end of the pressure equalizing conduit 55a, or liquid accidentally spills over into the float through the well 14f, as during handling or shipment of the apparatus, the liquid above the plane of the lower end of said conduit will be sucked out with the gas into the absorber when the equalizing valve 56 is open.

In the particular modification illustrated in Fig. 3, the conduit 26, devoid of a non-return flow device in contradistinction to the previous form, leads to an auxiliary absorber 100. The auxiliary absorber has communication, through a conduit 101, containing a non-return flow device or check valve 102, with the main absorber 103. Communication is adapted to be established between the main absorber and the high pressure section of the system through the beforementioned pressure equalizing conduit 55a which, as previously pointed out, differs from the conduit 55 of the first described form in that it leads from the receiver unit of the condenser, instead of from a trap between the dehydrator and the condenser coil.

Located within the main absorber 103 is a rocker arm 105 that carries a weight 106 at one end and has a hook-like extension 107 at the other, and suspended from said extension by a link 108 is a bucket 109 that is vertically movable within a vessel or sump 110 from which the drain conduit 35, containing the non-return flow device or check valve 36, leads to the heat exchanger 40. A siphon 112 has its receiving end in the main absorber adjacent the bottom thereof and its discharge end within the bucket 109, the overflow part of the siphon being near the top of the main absorber. The bucket 109 has a small drain opening 113 and is equipped with a drain siphon 114.

The weak liquor conduit 45 leads to the main absorber 103, and contains the pressure actuated valve 50. A branch conduit 45a leads from the conduit 45 to the auxiliary absorber 100, and contains a pressure actuated valve 50a similar to or identical with the pressure actuated valve 50. These valves 50 and 50a are biased toward closed position, and the closing may be effected by means of a spring (not shown) as hereinbefore explained with reference to valve 50, and the springs of the two valves may be of different strength, or may have associated with them ordinary adjusting means for varying the tension of the springs so that the two valves may be caused to open at different pressures. In any event, the valve 50a is constructed or set to open in response to a higher pressure than that which opens the valve 50.

In the operation of the present form of the invention the refrigerant gas passes from the evaporator 22 through the conduit 26 to the auxiliary absorber 100 and thence, through the conduit 101 to the main absorber, the auxiliary absorber, at the time, being practically free of liquor and at low pressure. Pressure in the main absorber 103 opens the valve 50 (which, as previously explained, is constructed or set to open at a lower pressure than valve 50a) and permits the delivery of weak liquor from the generator through the conduit 45 to the main absorber where it absorbs the refrigerant gas delivered to said vessel through the conduit 101. The liquor, thus enriched, accumulates within the main absorber until the level thereof reaches the overflow part of siphon 112 when flow of the strong liquor through said siphon will be inaugurated and as soon as enough of the liquor is discharged into the bucket 109 to overcome the weight 106, the rocker arm 105 swings on its pivotal axis, defined by the bearing 115, thereby to lift, through the stem 59, the valve member 57 of the equalizing valve 56 from the seat 58, opening communication through the equalizing conduit 55a between the high pressure section of the system (or more specifically the gas portion of the receiver 13a) and the main absorber, it being remembered that the end of the conduit 55a that is located within the receiver 13a is shielded from the liquid in the receiver by reason of its being located in the well 14f of the float 14a. While the main absorber is at high pressure due to the opening of the equalizing valve 56, and the check valve 102 is held closed by said high pressure, absorption takes place in the auxiliary absorber, liquid having been admitted thereto through the opening of the valve 50a under the influence of a somewhat higher pressure that builds up in the auxiliary absorber under the present conditions, thus sustaining refrigeration during the time the main absorber is emptying. It will thus be seen that continuous refrigeration is effected by use of the main and auxiliary absorbers. In other respects, the liquid return period is the same in the present modification as in the form previously described.

In the form of the invention illustrated in Fig. 4, the operating mechanism for the equalizing valve 56 is located in a vessel 200 that includes a sump 201 and which may be termed a pressure equalizing unit. This unit is separate from the main and auxiliary absorbers, designated 203 and 204, respectively, although, broadly, it may be regarded as a part of the absorber means.

Housed within the vessel 200 is a rocker arm 205 that carries a weight 206 at one end and a bucket 207 at the other. The bucket is adapted to rise and fall within the part of the vessel comprising the sump 201 as the arm oscillates. Pressure in the main absorber and in the vessel 200 is equalized through a conduit 208. A siphon 210 has its inlet end disposed within the main absorber 203, adjacent the bottom thereof, and its discharge end situated within the bucket 207, the overflow part of the siphon being near the top of the main absorber. The bucket 207 has a relatively small drain opening 211, and is equipped with a siphon 212. A branch conduit 45ª leads from the weak liquor conduit 45 to the auxiliary absorber 204 and contains a pressure actuated valve 50ª that is constructed or set to open at a somewhat higher pressure than valve 50 which controls the delivery of the weak liquor to the main absorber. Communication between the auxiliary and main absorbers is effected through a conduit 214, containing a non-return flow device or check valve 215. In the present instance, the pressure equalizing conduit 55ª leads from the receiver 13ª to the vessel 200 of the pressure equalizing unit, and the stem 59 of the valve member 57 of the equalizing valve bears upon or has operative connection with the rocker arm 205 between the weight 206 and the pivotal axis of said arm, defined by the bearing 216.

In the operation of this form of the invention, the liquor return period is inaugurated by the overflow of the rich liquor from the main absorber through the siphon 210, which overflow starts the siphonic action that continues until the main absorber is practically empty. Early in said period, however, when the bucket 207 is depressed by an accumulation of liquor therein, the arm 205 rocks in a direction to open the equalizing valve 56 thereby to establish communication between the high pressure section of the system and the vessel 200 of the exchange unit. This high pressure will immediately be communicated through the conduit 208 to the main absorber, allowing the liquid contents of the main absorber to discharge through the siphon 210 as above stated and through the sump 201, to the conduit 35 that conducts the rich liquor back to the heat exchanger 40 and thence to the generator 1.

In this, as in the other forms of the invention, the liquor compartment of the absorber is caused to practically empty before the equalizing valve 56 is closed due to the fact that as long as sufficient liquor remains in the bucket of the rocker arm or structure to overcome the opposing influence of the weight on the end thereof remote from the bucket, the valve member 57 will be hold off the seat 58.

In the embodiment illustrated in Fig. 5, the main absorber is designated 300 and the vessel constituting the same has a lateral extension 301 that joins intermediate the top and bottom thereof a vertically disposed part including a sump 302. Opposed to the lateral extension 301 is a similar but smaller extension 303, provided with a dome 304. Occupying the main absorber is a tubular rocker arm or structure 305 that supports an open top receptacle 306 in the main portion of the absorber vessel and a bucket 307 in the vertically disposed part that includes the sump 302. Extending from the side of the receptacle 306 opposite the tubular portion 305 of the rocker structure is an arm 308 that supports a weight 309 that is accommodated by the dome 304. The tubular portion 305 of the rocker arm or structure terminates in a siphon 310 that is located within the bucket 307 and has its high or overflow part adjacent the top, and its discharge end near the bottom, of the bucket. The bucket is provided with an emptying siphon 311 and a small drain hole 312.

The auxiliary absorber is designated 315 and it communicates, through a branch conduit 45ª, containing the pressure actuated valve 50ª, with the conduit 45 through which weak liquor is conveyed from the generator to the absorbers, flow to the main absorber 300 being controlled by the pressure actuated valve 50.

Associated with the absorbers 300 and 315, respectively, are a main absorber coil 320 and an auxiliary absorber coil 321, the two coils communicating with each other through a conduit 322 containing a non-return flow device or check valve 323 that opens toward the main absorber coil. Leading from the bottom of the auxiliary absorber are a conduit 325 that communicates with the bottom of the auxiliary absorber coil 321 and a conduit 326 that communicates with the top of said coil. Conduits 327 and 328 lead, respectively, from the top and bottom of the main absorber coil 320 up, over and into the main absorber and, descending through the top wall thereof and through the open top of the receptacle 306, terminate adjacent the bottom of the latter. The rocker structure is supported for oscillation within the main absorber vessel by a bearing 330; and between the pivotal axis of said structure, defined by said bearing, and the end thereof that carries the weight 309, said structure has operative connection, through the elongated stem 59, with the valve member 57 of the equalizing valve 56. This valve is in the pressure equalizing conduit 55ª that leads from the high pressure section of the system or, more specifically, from the receiver 13ª to the main absorber 300. The valve 57 is engaged with the seat 58 when the parts are in the position they occupy under the influence of the weight 309.

In the operation of the present form of the invention the refrigerant gas, leaving the evaporator 22, flows through the conduit 26, a part of the coil 321 and the conduit 322, past the check valve 323 to the main absorber coil 320. At the same time weak liquor is delivered through the conduit 45 past the pressure actuated valve 50 to the receptacle 306 within the main absorber. Now, due to a gas lift action and/or a thermosiphon action, a circulation is created through the main absorber coil and through the conduits 327 and 328 and the receptacle 306. The liquor continues to accumulate within the receptacle 306 and to circulate in the manner described, absorbing the gas delivered to the coil 320 through the conduit 322, until the level of the enriched liquor in the receptacle 306 attains an elevation corresponding to that of the high part of the siphon 310. Thereupon overflow of the strong liquor occurs, inaugurating the siphonic action that empties the receptacle 306, the liquid flowing therefrom through the tubular part of the rocker arm or structure 305 and through the siphon 310 into the bucket 307 from which it initially drains into the sump 302 only through the restricted opening 312 and, after reaching the high part thereof, also through the drain siphon 311.

As soon as the rocker arm or structure 305 is swung by the load of liquor in the bucket 307 in a direction to lift the weight 309, the member 57 of the equalizing valve 56 is unseated by reason of its connection through the stem 59 with said arm or structure. This establishes communication between the high pressure section of the apparatus and the main absorber through the equalizing conduit 55a, and such condition permits the return of the strong liquor from the sump 302 through the conduit 35 to the generator. While this high pressure prevails within the main absorber and in the parts in open communication therewith, the check valve 323 is held closed by said high pressure and shuts off communication between the two absorber coils or, more generally, between the two absorber portions of the system. As a result of this condition, pressure builds up within the auxiliary absorber and its coil sufficiently to open the valve 50a, permitting flow of the weak liquor from the conduit 45 through the branch conduit 45a into the auxiliary absorber 315. In this connection it may be explained that the power that holds the valve 50a closed (which, as previously stated, may be that of a spring—not shown—or the inherent resiliency of the diaphragm that carries the valve member) is superior to the fluid pressure exerted upon the small area of the valve member exposed to the interior of the conduit 45a that leads from the generator. Therefore, the valve remains closed against this pressure until additional pressure builds up within the auxiliary absorber sufficiently, when exerting its force on the relatively large area of the diaphragm, to overcome said valve closing power. Inasmuch as the refrigerant gas issuing from the conduit 26 is now confined to the auxiliary absorber section of the system, absorption continues therein while the main absorber section is subjected to the high pressure and while the strong liquor is draining to the generator. When the bucket 307 empties and permits the weight 309 to return the rocker arm or structure to its former position, the equalizing valve 56 closes. Upon the closing of the valve 56, the pressure within the main absorber drops and the higher pressure in the generator end of the system forces the weak liquor through the conduit 45 past the pressure actuated valve 50 into the receptacle 306. The weak liquor now entering the main absorber, absorbs the gas therein so as to further lower the pressure and when said pressure drops below that of the auxiliary absorber the check valve 323 opens and the liquor in the auxiliary absorber portion of the system transfers to the main absorber portion and operation proceeds as before.

Having thus described my invention, what I claim is:

1. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a self acting non-return flow device, communicative connections between the high pressure section and the absorber means, a valve in said connections, and floatless mechanism set in action by the weight of an accumulation of liquor to a given volume within the liquor compartment of the absorber means that acts solely on said value and independently of said non-return flow device to open said valve and maintain the same open until practically all liquor has passed from the liquor compartment of the absorber means to the aforesaid drain connections.

2. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a self acting non-return flow device, communicative connections between the high pressure section and the absorber means, a valve in said connections, the liquor compartment of the absorber means having an overflow and means whereby it is caused to practically empty under a substantially balanced pressure condition between the high pressure section and the absorber means, and floatless mechanism set in action by the weight of liquid overflowing from said liquor compartment, which mechanism acts solely on said value and independently of said non-return flow device to open the aforesaid valve so as to effect said balanced pressure condition and to maintain said valve open until practically all liquor has drained from the liquor compartment of the absorber means to the aforesaid drain connections.

3. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a self acting non-return flow device, communicative connections between the high pressure section and the absorber means, a valve in said connections, a valveless siphon through which the liquor compartment of the absorber means is adapted to practically empty to the aforesaid drain connections and the overflow part of which siphon determines the maximum liquid level in said liquor compartment, and floatless mechanism set in action by the weight of liquid overflowing through said siphon and serving to open the aforesaid valve and maintain the same open until practically all liquor has drained from the liquor compartment of the absorber means to said drain connections.

4. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a self acting non-return flow device, communicative connections between the high pressure section and the absorber means, a valve in said connections, a siphon through which the liquor compartment of the absorber means is adapted to practically empty to the aforesaid drain connections, a bucket supported for up-and-down movement and biased toward elevated position and into which the siphon discharges, the bucket being adapted to be depressed by the weight of liquor therein, and operative connections between said bucket and the aforesaid valve whereby said valve is opened when the bucket is depressed and is maintained open so long as the bucket remains depressed, the bucket having means whereby its contents may drain to said drain connections.

5. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a self acting non-return flow device, communicative connections between the high pressure section and the absorber means, a valve in said connections, a siphon through which the liquor compartment of the absorber means is adapted to practically empty to the aforesaid drain connections, an oscillating structure including a bucket into which the siphon discharges, the structure being biased to rock in a direction to elevate the bucket and being rocked in the other direction by a load of liquor in the bucket, and operative connections between said oscillating structure and the aforesaid valve whereby said valve is opened when the structure is rocked by a load of liquor in the bucket, the bucket being provided with means whereby it drains to the aforesaid drain connections.

6. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a self acting non-return flow device, communicative connections between the high pressure section and the absorber means, a valve in said connections, a siphon through which the liquor compartment of the absorber means is adapted to practically empty to the aforesaid drain connections, an oscillating structure, a bucket carried thereby and into which the siphon discharges thereby, through the weight of liquor, to rock the structure in one direction, a weight for rocking said structure in a direction to elevate the bucket, and operative connections between said structure and the aforesaid valve whereby said valve is opened when the structure is rocked by the depression of the bucket, the bucket being provided with means whereby it drains to the aforesaid drain connections.

7. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a non-return flow device, communicative connections between the high pressure section and the absorber means, a valve in said connections, a siphon through which the liquor compartment of the absorber means is adapted to practically empty to the aforesaid drain connections, a rocker arm pivotally supported intermediate its ends, a bucket carried by the rocker arm on one side of its pivotal axis and into which said siphon discharges, a weight carried by the arm on the opposite side of its pivotal axis which serves to rock the arm in a direction to elevate the bucket, the arm being rocked in opposition to said weight by a load of liquor in the bucket, the bucket including means through which it is drained to the aforesaid drain connections, and operative connections between the rocker arm and the aforesaid valve whereby the valve is opened when the arm is rocked by a load of liquor in the bucket.

8. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a non-return flow device, communicative connections between the high pressure section and the absorber means, a valve in said connections, a siphon through which the liquor compartment of the absorber means is adapted to practically empty to the aforesaid drain connections, a bucket into which the siphon discharges, means supporting the bucket for up-and-down movement, the bucket being biased toward elevated position and being depressed by liquor therein, operative connections between the bucket and the aforesaid valve whereby said valve is opened when the bucket is depressed, and a second siphon through which the bucket overflows and practically empties to the aforesaid drain connections.

9. In an absorption refrigeration apparatus characterized by a high pressure section and a low pressure section and including a generator in the high pressure section and an evaporator in the low pressure section, absorber means having a liquor compartment the bottom of which is at an elevation above the maximum liquid level in the generator, conduit means conducting weak liquor from the generator to the liquor compartment of the absorber means, conduit means conducting refrigerant gas from the evaporator to the absorber means, drain connections between the absorber means and the generator including a non-return flow device, communicative connections between the high pressure section and the absorber means, a valve in said connections, a siphon through which the liquor compartment of the absorber means is adapted to practically empty to the aforesaid drain connections, a bucket into which the siphon discharges, means supporting the bucket for up-and-down movement, the bucket being biased toward elevated position and being depressed by liquor therein, operative connections between the bucket and valve whereby said valve is opened when the bucket is depressed, and a second siphon through which the bucket overflows and partially empties to the aforesaid drain connections, said bucket having a relatively small opening through which it drains completely to said connections.

10. In an absorption refrigeration apparatus characterized by a high pressure section and a low pressure section and including a generator in the high pressure section and an evaporator in the low pressure section, a main absorber including a liquor compartment the bottom of which is at an elevation above the maximum liquid level in the generator, an auxiliary absorber, conduit means conducting weak liquor from the generator to the auxiliary absorber and to the liquor compartment of the main absorber, flow control means governing delivery of the weak liquor to the auxiliary absorber, the obstructing effect of which is such that greater pressure is required to deliver the weak liquor to the auxiliary absorber than to the liquor compartment of the main absorber, a conduit for conducting fluid from the auxiliary absorber to the liquor compartment of the main absorber and including a non-return flow device, conduit means conducting refrigerant gas from the evaporator to the auxiliary absorber, drain connections between the main absorber and the generator including a non-return flow device, communicative connections between the high pressure section of the apparatus and the main absorber, a valve in said connections, the liquor compartment of the main absorber being provided with an overflow and arranged to practically empty to the aforesaid drain connections upon a practical equalization of pressure between the high pressure section and the main absorber, and mechanism set in action by overflow of liquor from the liquor compartment of the main absorber and serving to open the aforesaid valve thereby to effect said equalization of pressure and maintain said valve open until said liquor compartment is practically empty.

11. In an absorption refrigeration apparatus characterized by a high pressure section and a low pressure section and including a generator in the high pressure section and an evaporator in the low pressure section, a main absorber including a liquor compartment, an auxiliary absorber, conduit means conducting weak liquor from the generator to the auxiliary absorber and to the liquor compartment of the main absorber and involving two flow control means, one individual to each absorber, and so related in their capacity to obstruct flow that greater pressure is required to deliver the weak liquor to the auxiliary absorber than to the liquor compartment of the main absorber, a conduit for conducting fluid from the auxiliary absorber to the liquor compartment of the main absorber and including a non-return flow device, conduit means conducting refrigerant gas from the evaporator to the auxiliary absorber, drain connections between the main absorber and the generator including a non-return flow device, communicative connections between the high pressure section of the apparatus and the main absorber, a valve in said connections, the liquor compartment of the main absorber being provided with an overflow and arranged to practically empty to the aforesaid drain connections upon a practical equalization of pressure between the high pressure section and the main absorber, and mechanism set in action by overflow of liquor from the liquor compartment of the main absorber and serving to open the aforesaid valve thereby to effect said equalization of pressure and maintain said valve open until said liquor compartment is practically empty.

12. In an absorption refrigeration apparatus characterized by a high pressure section and a low pressure section and including a generator in the high pressure section and an evaporator in the low pressure section, a main absorber including a liquor compartment, an auxiliary absorber, conduit means conducting weak liquor from the generator to the auxiliary absorber and to the liquor compartment of the main absorber, flow control means in said conduit means of such nature that greater pressure is required to deliver the weak liquor to the auxiliary absorber than to the liquor compartment of the main absorber, a conduit for conducting fluid from the auxiliary absorber to the liquor compartment of the main absorber and including a non-return flow device, conduit means conducting refrigerant gas from the evaporator to the auxiliary absorber, drain connections between the main absorber and the generator including a non-return flow device, communicative connections between the high pressure section and the main absorber, a valve in said connections, a siphon through which the liquor compartment of the main absorber overflows and practically empties, a bucket into which said siphon discharges, means supporting said bucket for up-and-down movement, the bucket being biased toward elevated position and being adapted to be depressed by a load of liquor therein, operative connections between the bucket and the aforesaid valve whereby the valve is opened when the bucket is depressed, and means through which the bucket is drained to said drain connections.

13. In an absorption refrigeration apparatus characterized by a high pressure section and a low pressure section and including a generator in the high pressure section and an evaporator in the low pressure section, a main absorber having a liquor compartment, an auxiliary absorber, conduit means conducting weak liquor from the generator to both absorbers, flow control means in said conduit means of such nature that greater pressure is required to deliver weak liquor to the auxiliary absorber than to the liquor compartment of the main absorber, conduit means for conducting liquor from the auxiliary absorber to the main absorber and including a non-return flow device, conduit means conducting refrigerant gas from the evaporator to the auxiliary absorber, an enclosure, a conduit through which the top portion of the enclosure communicates with the main absorber, drain connections between the bottom portion of said enclosure and the generator and including a non-return flow device, communicative connections between the high pressure section and said enclosure, a valve in said connections, a siphon through which the liquor compartment of the main absorber overflows and practically empties, a bucket supported for up-and-down movement within said enclosure and into which said siphon discharges, said bucket being biased toward an elevated position, and operative connections between said bucket and the aforesaid valve whereby said valve is opened when the bucket is depressed by a load of liquor therein, the bucket having means through which it drains to the aforesaid drain connections.

14. In an absorption refrigeration apparatus characterized by a high pressure section and a low pressure section and including a generator in the high pressure section and an evaporator in the low pressure section, an absorber vessel including a liquor compartment and a sump, a siphon through which said liquor compartment overflows and practically empties, a rocker arm supported for oscillation within the liquor compartment of the absorber and having a part extending into the sump, a bucket sustained by said part within the sump for up-and-down movement as the rocker arm is oscillated on its pivotal axis, a weight operatively connected to the arm for swinging it in a direction to elevate the bucket, the aforesaid siphon being arranged to discharge into the bucket, said bucket having drain means whereby its contents empties with retarded flow into the sump, said absorber vessel being so related to the generator that said sump is at an elevation above that of the maximum liquid level in the generator, conduit means conducting weak liquor from the generator to the liquor compartment of the absorber vessel, conduit means conducting refrigerant gas from the evaporator to the absorber vessel, drain connections between the sump of the absorber vessel and the generator including a non-return flow device, communicative connections between the high pressure section of the apparatus and the absorber vessel, a valve in said connections, and operative connection between said valve and the rocker arm whereby said valve is opened when the rocker arm is swung in opposition to the aforesaid weight by a load of liquor in the bucket.

15. In an absorption refrigeration apparatus characterized by a high pressure section and a low pressure section and including a generator in the high pressure section and an evaporator in the low pressure section, a main absorber, an auxiliary absorber, an enclosure providing a sump, communicative connections between the enclosure and the gas space of the main absorber, the main absorber being at a higher elevation than the enclosure, and the enclosure being so related to the generator that said sump is at an elevation above the maximum liquid level in the generator, drain connections between the sump and the generator including a non-return flow device, a siphon through which the main absorber overflows and by which it is practically emptied of liquor, the same having its discharge end in the enclosure, a rocker arm supported for oscillation in the main absorber, a bucket in the enclosure, means extending through the aforesaid communicative connections whereby the bucket is suspended from the rocker arm, a weight operatively connected to the aforesaid arm and tending to rock it in a direction to elevate the bucket, the aforesaid siphon being arranged to discharge into the bucket, the bucket having means through which it drains with retarded flow into the enclosure, conduit means conducting weak liquor from the generator to the main and auxiliary absorbers, flow control means in said conduit means of such nature that greater pressure is required to deliver liquor to the auxiliary absorber than to the main absorber, a conduit for conducting fluid from the auxiliary absorber to the main absorber and including a non-return flow device, conduit means conducting refrigerant gas from the evaporator to the auxiliary absorber, communicative connections between the high pressure section of the apparatus and the main absorber, a valve in said connections, and operative connections between the rocker arm and said valve whereby the valve is opened when the rocker arm is swung on its pivotal axis by the depression of the bucket through the weight of a load of liquor therein.

16. In an absorption refrigeration apparatus characterized by a high pressure section and a low pressure section and including a generator in the high pressure section and an evaporator in the low pressure section, a main absorber, an auxiliary absorber, an enclosure including a sump and being so related to the generator that said sump is at a higher elevation than the maximum liquid level in the generator, communicative connections between the enclosure and the gas space of the main absorber, drain connections between said sump and the generator including a non-return flow device, a siphon through which the main absorber overflows and by which it is practically emptied of liquor, the same having its discharge end in the enclosure, a rocker arm supported for oscillation in the enclosure, a bucket carried by the arm to one side of the pivotal axis of said arm and provided with means through which it drains with retarded flow into the sump of the enclosure, a weight having operative connection with said rocker arm and tending to rock the arm in a direction to elevate the bucket, the aforesaid siphon being arranged to discharge into the bucket, conduit means conducting weak liquor from the generator to the main and auxiliary absorbers, control means in said conduit means of such nature that greater pressure is required to deliver liquor to the auxiliary absorber than to the main absorber, a conduit for conducting fluid from the auxiliary absorber to the main absorber and including a non-return flow device, conduit means conducting refrigerant gas from the evaporator to the auxiliary absorber, communicative connections between the high pressure section of the apparatus and the aforesaid enclosure, a valve in said connections, and operative connections between the rocker arm and said valve whereby the latter is opened when the rocker arm is swung on its pivotal axis by the depression of the bucket due to a load of liquor therein.

17. In an absorption refrigeration apparatus characterized by a high pressure section and a low pressure section and including a generator in the high pressure section and an evaporator in the low pressure section, a main absorber comprising a vessel including a low part providing a sump and the elevation of which sump is above that of the maximum liquid level in the generator, drain connections between the sump and the generator and including a non-return flow device, a rocker structure supported for oscillation within the absorber vessel and including a bucket located to one side of the pivotal axis of said structure, the bucket being arranged above said low part of the absorber vessel and having means through which it drains with retarded flow into the sump, a receptacle incorporated in the rocker structure, the same constituting the liquor compartment of the main absorber, a siphon carried by the rocker structure and through which said receptacle overflows and practically empties, said siphon being arranged to discharge into the bucket, the rocker structure being biased to swing in a direction to elevate the bucket and being adapted to be swung in the opposite direction by a load of liquor in the bucket, an auxiliary absorber, a main absorber circulating unit and an auxiliary absorber circulating unit, conduits leading from the end portions of the main absorber circulating unit into the main absorber vessel and opening into the aforesaid receptacle adjacent the bottom thereof, conduits leading from the end portions of the auxiliary absorber circulating unit and communicating with the auxiliary absorber adjacent the bottom thereof, a conduit leading from the auxiliary absorber circulating unit to the main absorber circulating unit and including a non-return flow device, conduit means conducting refrigerant gas from the evaporator to the auxiliary absorber circulating unit, conduit means conducting weak liquor from the generator to the main and auxiliary absorbers, flow control means in said conduit means of such nature that greater pressure is required to deliver liquor to the auxiliary absorber than to the main absorber, said conduit means being arranged to discharge the weak liquor delivered to the main absorber into the aforesaid receptacle, communicative connections between the high pressure section of the apparatus and the main absorber, a valve in said connections, and operative connections between the rocker structure and said valve whereby the valve is opened when said structure is swung on its pivotal axis by a load of liquor in the bucket.

18. In an absorption refrigeration apparatus characterized by a high pressure section and a low pressure section and including a generator in the high pressure section and an evaporator in the low pressure section, absorber means having a liquor compartment at an elevation above that of the maximum liquid level in the generator, conduit means conducting weak liquor from the generator to the liquor compartment of the absorber means and including a flow control device and a filter between said device and the generator, conduit means conducting refrigerant gas from the evaporator to the absorber means, drain connections between the absorber means and the generator including a self acting non-return flow device, communicative connections between the high pressure section of the apparatus and the absorber means, a valve in said connections, and floatless mechanism set in action by the weight of an accumulation of liquor to a given volume within the liquor compartment of the absorber means that acts solely on said valve and independently of said non-return flow device to open the aforesaid valve and maintain the same open until practically all liquor has passed from the liquor compartment of the absorber means to the aforesaid drain connections.

WILBUR G. MIDNIGHT.